US010757064B2

(12) United States Patent
Sinha et al.

(10) Patent No.: US 10,757,064 B2
(45) Date of Patent: Aug. 25, 2020

(54) COMMUNICATION INTERFACE FOR HANDLING MULTIPLE OPERATIONS

(71) Applicant: Oracle International Corporation, Redwood Shores, CA (US)

(72) Inventors: Kunal Sinha, Cedar Park, TX (US); Olivier Oudghiri, Crolles (FR)

(73) Assignee: Oracle International Corporation, Redwood Shores, CA (US)

(*) Notice: Subject to any disclaimer, the term of this patent is extended or adjusted under 35 U.S.C. 154(b) by 424 days.

(21) Appl. No.: 15/344,463

(22) Filed: Nov. 4, 2016

(65) Prior Publication Data
US 2017/0126614 A1 May 4, 2017

Related U.S. Application Data

(60) Provisional application No. 62/250,712, filed on Nov. 4, 2015.

(51) Int. Cl.
*H04L 12/58* (2006.01)
*H04L 29/08* (2006.01)
*H04L 29/06* (2006.01)

(52) U.S. Cl.
CPC ............ *H04L 51/36* (2013.01); *H04L 51/04* (2013.01); *H04L 67/02* (2013.01); *H04L 67/10* (2013.01); *H04L 67/42* (2013.01)

(58) Field of Classification Search
CPC ......... H04L 51/36; H04L 67/02; H04L 51/04; H04L 67/10; H04L 67/42
See application file for complete search history.

(56) References Cited

U.S. PATENT DOCUMENTS

| 6,694,375 B1 * | 2/2004 | Beddus ............ H04L 29/12103 709/249 |
| 7,240,125 B2 | 7/2007 | Fleming |
| 7,296,022 B2 | 11/2007 | Harjanto |

(Continued)

FOREIGN PATENT DOCUMENTS

| KR | 1020070076154 | 7/2007 |
| WO | 2014039919 | 3/2014 |

OTHER PUBLICATIONS

Directory Services Markup Language v2.0, Dec. 18, 2001, 26 pages.

*Primary Examiner* — Shean Tokuta
*Assistant Examiner* — Juan C Turriate Gastulo
(74) *Attorney, Agent, or Firm* — Kilpatrick Townsend & Stockton LLP

(57) ABSTRACT

Techniques are disclosed for a communication system that facilitates communication between a computing device and a computer system. In some examples, the computing device can support a first communication protocol (e.g., hypertext transfer protocol (HTTP)). In such examples, the computer system can support a second communication protocol (e.g., Lightweight Directory Access Protocol (LDAP)). In some examples, the communication system can provide a callable, communication interface that supports one or more communication protocols and that provides functions to enable the computing device t to communicate with the computer system. For example, the communication interface can enable the computing device to use HTTP to communicate with the computer system to perform operations defined using LDAP.

12 Claims, 6 Drawing Sheets

(56) References Cited

U.S. PATENT DOCUMENTS

| | | |
|---|---|---|
| 7,320,074 B2 | 1/2008 | Eggebraaten et al. |
| 7,653,750 B2 | 1/2010 | Fleming |
| 7,849,496 B2 | 12/2010 | Ahern et al. |
| 7,970,943 B2 * | 6/2011 | Lin ...................... G06F 16/258 709/246 |
| 8,365,204 B2 | 1/2013 | Lin et al. |
| 8,782,769 B2 | 7/2014 | Gupta et al. |
| 9,081,951 B2 | 7/2015 | Sondhi et al. |
| 2002/0129153 A1 | 9/2002 | Fleming |
| 2004/0024808 A1 * | 2/2004 | Taguchi .............. H04L 67/1095 709/203 |
| 2004/0243668 A1 * | 12/2004 | Harjanto ........... H04L 29/12169 709/203 |
| 2005/0015375 A1 | 1/2005 | Harjanto |
| 2007/0220015 A1 | 9/2007 | Fleming |
| 2010/0313210 A1 | 12/2010 | Lin et al. |
| 2012/0203781 A1 * | 8/2012 | Wakefield ......... H04L 29/12169 707/736 |
| 2013/0081128 A1 * | 3/2013 | Gupta ................. G06F 9/45512 726/9 |
| 2013/0086210 A1 * | 4/2013 | Yiu ........................ G06F 21/41 709/217 |
| 2013/0318117 A1 * | 11/2013 | Mohamad Abdul ........................ G06F 16/1748 707/769 |
| 2014/0156684 A1 * | 6/2014 | Zaslavsky ............. G06F 16/242 707/756 |
| 2014/0201814 A1 * | 7/2014 | Barkie ................. H04L 63/107 726/4 |
| 2014/0289838 A1 | 9/2014 | Gupta et al. |

\* cited by examiner

COMMUNICATION INTERFACE FOR HANDLING MULTIPLE OPERATIONS

CROSS-REFERENCES TO RELATED APPLICATIONS

The present non-provisional application claims benefit and priority of U.S. Provisional Patent Application No. 62/250,712, titled "REST API FOR UNIFIED DIRECTORY SYSTEM," filed on Nov. 4, 2015, the entire contents of which are incorporated by reference herein.

BACKGROUND

Access to resources, whether via Internet or Intranet, on-premise or in-the-cloud, can depend on authentication and authorization of users. An identity management system (IDM) can provide authentication and authorization services for access to resources. Some IDM systems can implement an identity repository that provides a directory infrastructure for implementing identity management.

Some repositories in an IDM system can support a Lightweight Directory Access Protocol (LDAP) interface for communication. LDAP is growing in importance as more businesses adopt customer-facing applications, mobile computing and cloud computing-based solutions. This growth is leading to an increase in the number of objects that are managed in LDAP-based systems.

REST is a software architectural style that relies on a stateless, client-server, cacheable communications protocol, such as hypertext transfer protocol (HTTP). A REST-based interface can adhere to the constraints of REST. While REST is increasingly becoming popular, some enterprise systems cannot support a REST-based protocol. Existing IDM systems can be defined using LDAP to support the demands of business applications and customer solutions. An LDAP-based interface is not able to support REST-based protocols.

BRIEF SUMMARY

Generally, the present application relates to data processing. More specifically, the application is related to a communication interface defined for a Representation State Transfer (REST) supported protocol. The communication interface can facilitate communication with an identity management (IDM) system having an interface that supports a lightweight directory access protocol (LDAP).

In some examples, a communication system can facilitate communication with a computing system ("target system") having a communication interface that supports a defined communication protocol (e.g., LDAP). A target system can be part of an enterprise computer system. Specifically, in certain examples, the communication system can provide a callable, communication interface that supports one or more communication protocols (e.g., a REST defined protocol) and that provides functions to enable a client to communicate with a target system.

The communication interface can facilitate communication via LDAP to perform operations supported by a target system. For example, the communication interface can enable a client system ("client") to use a REST-based protocol to communicate (e.g., send requests and receive responses) with a directory system of an identity management (IDM) system to perform operations defined using LDAP.

A communication system can be implemented to support a communication interface as disclosed herein. The communication system can be implemented by one or more computer systems. The communication system may include one or more processors and one or more memories accessible to the one or more processors and storing one or more instructions, which, upon execution by the one or more processors, causes the one or more processors to implement methods and/or operations disclosed herein. The computer system can be configured to implement methods and operations described herein. Yet other examples relate to systems and machine-readable tangible storage media which employ or store instructions for methods and operations described herein.

The communication system can be communicatively coupled to a target system and one or more clients that communicate with the target system. For example, the target system can be IDM system that includes a directory system that can be controlled by LDAP-defined operations. The communication system can be implemented by the target system, the client(s) accessing the target system, or a combination thereof. For example, the communication system can provide an application programming interface (API) that is accessible to the client(s) that access the target system. Through the API, the communication system can receive requests to perform operations at the target system and the requests can be translated for communication to the target system. The communication system can receive responses from the target system to communicate to intended recipients and the responses can be translated for communication to the client(s) identified as the intended recipients.

The API provided by the communication interface can be defined using a protocol that conforms to REST. The protocol defined for the API can be implemented based on one of many different protocols, such as HTTP, which conform to REST. The API can provide functions and support operations defined in REST that expose controls and operations of a target system.

The communication system can be configured such that functions supported by the API are mapped to operations supported by the target system. The communication interface can be defined such that there is a one-to-one relationship between the functions of the communication interface and the operations supported by the target system. In some examples, the functions of the API can be defined similar to LDAP operations of the target system. In some examples, the communication interface can be defined such that there is a one-to-many relationship between the functions of the communication interface and the operations defined by the target system. For example, one function of the communication interface can be mapped to multiple operations of the target system.

The format for the functions provided by the API of the communication system can be defined using one of many different types of formats including JavaScript Objection Notation (JSON). To avoid having sensitive data in the URL of an HTTP request (for privacy reasons), all LDAP operations can be mapped to POST HTTP requests so that the operation-specific data can be specified in the payload of the HTTP request. In some examples, the payload of an HTTP request can include one or more attributes that map to one or more attributes of a schema definition for operation of the target system. For example, an HTTP request can include a payload that defines attributes that map to attributes in a schema definition of a directory system included in the target system.

In some examples, the communication interface can support multiple modes of operation. In some examples, the communication interface can provide 1) a REST mode, and 2) a POST mode. In some examples, requests received via the API of the communication interface can use a HTTP POST while in the POST mode. In some examples, requests can be submitted as one of an HTTP GET, an HTTP POST, an HTTP PATCH, or an HTTP DELETE while in the REST mode. In one illustrative example of a REST mode, an HTTP verb (sometimes referred to as an HTTP method) can be mapped to an equivalent LDAP operation for all interactions in the REST mode. For example, an HTTP POST can perform an LDAP add, and an HTTP DELETE can perform an LDAP delete. Likewise, HTTP GET and HTTP PATCH can be used to perform LDAP searches and LDAP modifications respectively. A POST mode is supported all LDAP operations for security reasons. Additionally, some LDAP operations (such as a compare) don't have equivalent HTTP verbs so POST is the only way of performing those over HTTP. In some examples, the mode can be configured as a parameter defined by the communication interface.

In some examples, a communication system that facilitates communication with a computer system ("target system") can be implemented by a computer system. The communication system can be part of or communicatively coupled to a directory system. The target system can be included in or implemented as an enterprise computer system. The communication system can be configured to implement methods and operations described herein. Yet other examples relate to systems and machine-readable tangible storage media which employ or store instructions for methods and operations described herein.

In at least one example, a method can include receiving, by a first computer system, a request from a computing device. In some examples, the request can indicate a plurality of operations to be performed. In such examples, the request can be in accordance with a first communication protocol. The method can further include identifying a first operation of the plurality of operations based on the request. In some examples, the first operation can be in accordance with a second communication protocol that is supported by a second computer system. In such examples, the second communication protocol can be different from the first communication protocol. The method can further include performing, by the second computer system, the identified first operation and, based on a result of performing the first operation, identifying a second operation of the plurality of operations based on the request. In some examples, the second operation can be in accordance with a second communication protocol. The method can further include performing, by the second computer system, the identified second operation and determining, by the first computer system, a result of performing the second operation. The method can further include generating, by the first computer system, a response in accordance with the first communication protocol. In some examples, the response can include the result of performing the plurality of operations indicated by the request. The method can further include sending, by the first computer system, the response to the computing device.

Numerous benefits are achieved by way of the present disclosure over conventional techniques. For example, embodiments of the present disclosure can reduce a number of requests sent by a computing device to a communication system. In addition, embodiments of the present disclosure can reduce an amount of processing for requests by the communication system. And in an enterprise system with thousands of requests any given day, embodiments of the present disclosure can allow a significant reduction in processing and improve efficiency of processing operations.

These and other embodiments of the disclosure, along with many of its advantages and features, are described in more detail in conjunction with the text below and attached figures.

The foregoing, together with other features and examples will become more apparent upon referring to the following specification, claims, and accompanying drawings.

BRIEF DESCRIPTION OF THE DRAWINGS

Illustrative examples of the present disclosure are described in detail below with reference to the following drawing figures.

DETAILED DESCRIPTION

In the following description, for the purposes of explanation, specific details are set forth in order to provide a thorough understanding of examples of this disclosure. However, it will be apparent that various examples can be practiced without these specific details. For example, circuits, systems, algorithms, structures, techniques, networks, processes, and other components can be shown as components in block diagram form in order not to obscure the examples in unnecessary detail. The figures and description are not intended to be restrictive.

The present disclosure relates generally to techniques for facilitating communication between a client and a computer system ("target system"). In some examples, a target system can support a communication protocol, such as Lightweight Directory Access Protocol (LDAP). In such examples, a communication system can provide a callable, communication interface that supports one or more communication protocols (e.g., Hypertext Transfer Protocol (HTTP)) that are different from the communication protocol supported by the target system. The communication interface can enable communication with the target system irrespective of the communication protocol supported by the target system. The communication interface can be defined using a communication protocol (e.g., HTTP). In some examples, when the communication protocol is HTTP, the HTTP can be in accordance with Representation State Transfer (REST). The communication interface can convert requests from a client to a format understandable by the target system. The communication interface can also convert responses from the target system to a format understandable by the client.

Figure 1:
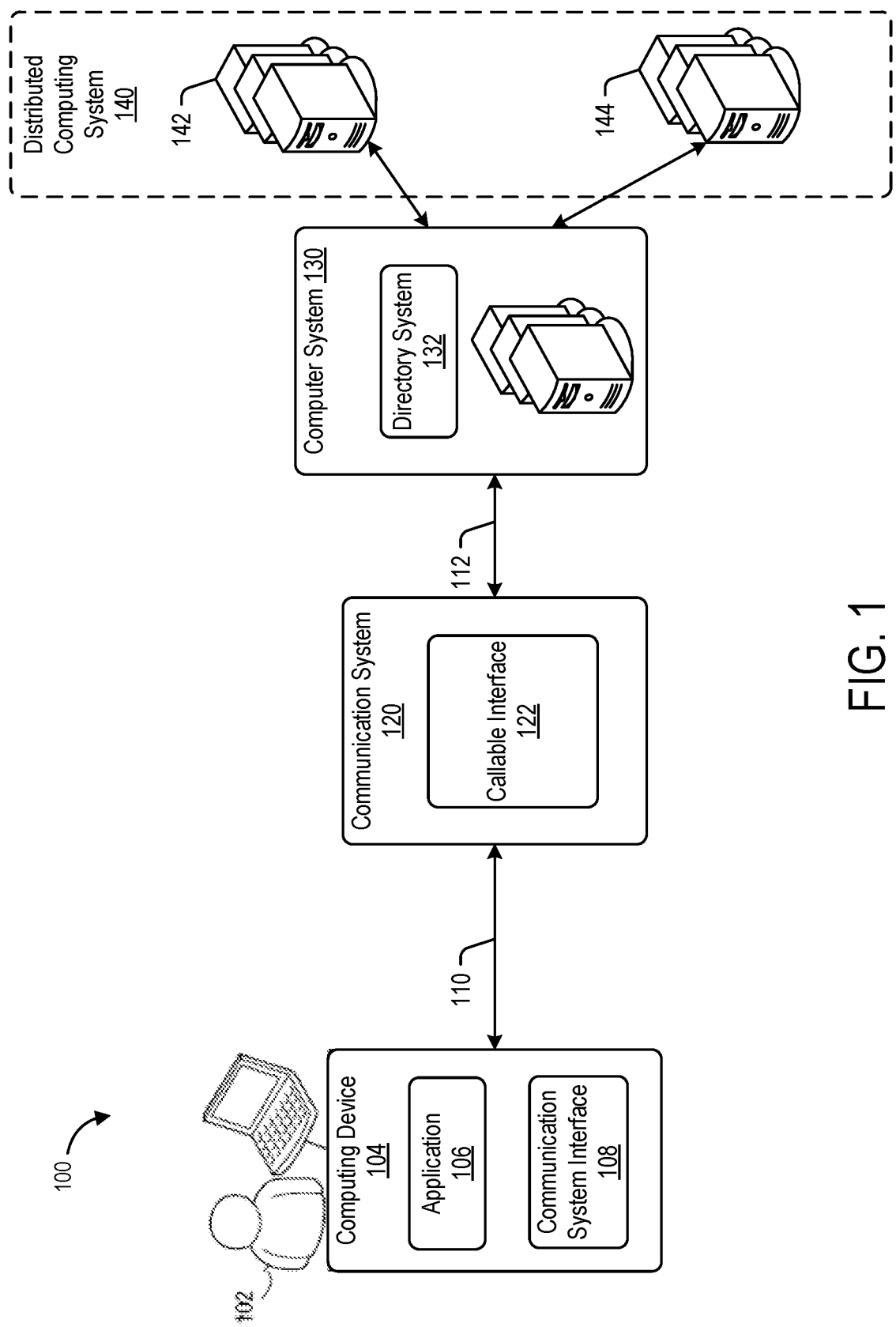
FIG. 1 illustrates a high-level diagram of a communication interface environment according to some embodiments.

Some examples, such as systems, methods, and machine-readable media, are disclosed for facilitating communication between one or more clients and a target system. FIG. 1 illustrates a high-level diagram of a communication interface environment 100 according to some embodiments. In some examples, a communication system 120 can facilitate communication with a computer system 130. For purposes of illustration, various examples are provided herein to describe techniques for enabling a computing device 104 to communicate with the computer system 130. Such communications can be to exchange or transfer data, request services provides by the computer system 130, perform one or more operations at the computer system 130 or a system accessible to the computer system 130 (e.g., a distributed computing system 140), communicate messages, access a directory system (e.g., directory system 132), or combinations thereof. In some examples, the computing device 104 can include an application 106 to communicate with the communication system 120. Computing device 104 can be operated by a user 102.

Communication in the communication interface environment 100 can include sending and receiving messages. A message can include, without limitation, a service invocation message, a result message, a request message, a response message, other messages communicated internally, other messages communicated between the computing device 104 and the communication system 120, or any combination thereof.

In some examples, a message can include one or more attributes. For example, a message can include a message type (e.g., a type value from a set of shared type constants), an identifier (e.g., an id used to correlate this message with one or more other messages), priority information to support priority-based message queues, timeout, sensitivity indicator to support message data isolation, message source (e.g., a uniform resource identifier of a sender), a message destination (e.g., a uniform resource identifier of the destination), a response to an operation, a request context (e.g., request information from dispatcher), and/or a message payload. The payload can include one or more attributes. The one or more attributes of the payload can be different than the one or more attributes of the message depending upon the type of message that is being sent, such as parameter data and result data.

In some examples, the one or more attributes of the payload might not be validated by the communication system 120. In such examples, an operation can be generated and sent based on the one or more attributes without being validated. In some examples, the computer system 130, which can receive the operation from the communication system 120, can determine whether the one or more attributes are valid. If the computer system 130 determines the one or more attributes are valid, the computer system 130 can perform the operation. If the computer system 130 determines the one or more attributes are invalid, the computer system 130 can provide a result to the operation indicating that the one or more attributes are invalid. By the communication system 120 not validating the one or more attributes, processing by the communication system 120 can be saved. In addition, because the one or more attributes are not validated by the communication system 120, an order and/or format of each of the one or more attributes can be different from request to request. For example, a first request can have the one or more attributes in a first order. In such an example, a second request can have the one or more attributes in a second order. But because the communication system 120 does not validate the one or more attributes, the order does not matter to the communication system 120.

Furthermore, because the communication system 120 does not validate the one or more attributes, a single system does not need to know how to validate every possible set of attributes. For example, when a first operation is sent to the computer system 130, the computer system 130 can know how to validate one or more attributes for the computer system 130. In such an example, when a second operation is sent to a different computer system (other than the computer system 130), the different computer system can know how to validate one or more attributes for the different computer system but the communication system 120 and/or the computer system 130 might not know how to validate the one or more attributes for the different computer system).

The communication system 120 can facilitate communication between the computing device 104 and the computer system 130 to access one or more resources and or communicate enterprise data. A resource can include, without restriction, a file, a web page, a document, web content, a computing resource, data, an application, or any combination thereof. A resource can be requested and accessed using an application. For example, an application can request access to a web page from a resource server based on a uniform resource identifier identifying a resource on the resource server.

Data as described herein can include, without limitation, data that is received, sent, processed, or combinations thereof, in the computer system 130. Data, such as enterprise data, can be distinguishable from data for consumer applications and/or services. In some examples, enterprise data can change based on an application or use of the enterprise data, whereas data for consumer applications (e.g., consumer data) can remain static through use. In certain examples, enterprise data can include or be associated with rules that indicate criteria for storing, using, and/or managing the enterprise data. For example, enterprise data can be associated with policy information that indicates one or more policies for storing, using, and/or managing the enterprise data.

In certain examples, policy information can be included in enterprise data. In certain examples, enterprise data can include data processed, stored, used, or communicated by an application or a service executing in an enterprise computer system. For example, enterprise data can include business data (e.g., business objects) such as JSON (JavaScript Object Notation) formatted data from enterprise applications, structured data (e.g., key value pairs), unstructured data (e.g., internal data processed or used by an application, data in JSON format, social posts, conversation streams, activity feeds, etc.), binary large objects (BLOBs), documents, system folders (e.g., application related folders in a sandbox environment), data using representational state transfer (REST) techniques (referred to herein as "RESTful data") (e.g., synchronization data made available by REST endpoints), system data, configuration data, synchronization data, or any combination thereof. In some examples, enterprise data can include REST-formatted enterprise data. REST-formatted enterprise data can include RESTful data. REST-formatted data can include data formatted according to REST techniques implemented by an enterprise computer system. In some examples, enterprise data can include LDAP-formatted enterprise data formatting according to LDAP. Configuration or synchronization data can include data used for synchronization of enterprise data, such as versions, history, integration data, etc. Documents in enterprise data can include extended markup language (XML) files, visual assets, configuration files, media assets, etc. A BLOB can include a collection of binary data stored as a single entity in a database management system, such as an image, multimedia object, or executable code, or as otherwise known in the art.

The computer system 130 can include various computer systems that are configured to operate for an entity or an enterprise. For example, an enterprise computer system can include one or more computer systems, such as an enterprise server computer (e.g., a back-end server computer), to handle requests for services. An enterprise computer system can include applications and/or services, which can process and/or operate using enterprise data. In FIG. 1, for example, computer system 130 can provide one or more services and/or applications for managing or operating an enterprise. Services can include, without restriction, customer relationship management (CRM), human capital management (HCM), human resource (HR) management, supply chain management, enterprise communication, email communication, business services, other enterprise management services or applications, or any combination thereof. In some examples, the computer system 130 can be a cloud computer system.

In some examples, the computer system 130 can include a directory system 132. An example of directory system 132 is a directory system provided by Oracle® Corporation. The directory system 132 can provide directory services in an computer environment. The directory services can include storage, synchronization, proxy, and virtualization. In some examples, the directory system 132 can support communication using one or more communication protocols such as LDAP. The directory system 132 can be implemented with or communicatively coupled to one or more computers that provide LDAP storage. The directory system 132 can enable deployment of fewer fragmented components and provides deployment flexibility. The directory system 132 can provide high availability and reduced administration via its proxy and replication technology, for monolithic and distributed deployments. In some examples, the directory system 132 can act as a proxy system for one or more resources. In such examples, the directory system 132 can facilitate the performance of an operation on the one or more resources.

In some examples, the computer system 130 may include or be in communication with an identity management (IDM) system. In such examples, the directory system 132 may be provided as part of the IDM system. The IDM system may communicate with the directory system 132 using a programming interface (e.g., an API). The programming interface may be implemented using LDAP.

In some examples, the computer system 130 can implement or can be communicatively coupled to a distributed computing system 140. The distributed computing system 140 can include one or more computer systems (e.g., a computer system 142 and a computer system 144). The computer system 130 can facilitate or handle, as a proxy, communication with the distributed computing system 140. The distributed computing system 140 can communicate according to a communication protocol that is different from the communication protocol supporting the distributed computing system 140. As such, the computer system 130 can communicate information from the computing device 104 to the distributed computing system 140 via the communication system 120.

The computer system 130 can be implemented by a computing system. The computing system can include one or more computers and/or servers (e.g., one or more access manager servers), which can be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The distributed computing system 140 can run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. The computer system 130 can be implemented using hardware, firmware, software, or any combination thereof.

The communication system 120 can be implemented to operate as an intermediary computing environment that can facilitate communication between a client and one or more enterprise computer systems because the client cannot be configured to communicate with such enterprise computer systems directly. For example, some enterprise computer systems can be supported by legacy or back-end computer systems. Such systems can be configured to operate using different communication protocols. As such, communication system can implement techniques to facilitate communication between enterprise computer systems and clients to enable them to communicate with each other despite their incompatibilities in communication, such as differences between formats or communication protocols.

The communication system 120 can include at least one memory, one or more processing units (or processor(s)), and storage. The processing unit(s) can be implemented as appropriate in hardware, computer-executable instructions, firmware, or any combination thereof. In some examples, the communication system 120 can include several subsystems and/or modules. For example, the communication system 120 can include a callable interface 122, which can be implemented in hardware, software (e.g., program code, instructions executable by a processor) executing on hardware, or any combination thereof. In some examples, the software can be stored in a memory (e.g., a non-transitory computer-readable medium), on a memory device, or some other physical memory and can be executed by one or more processing units (e.g., one or more processors, one or more processor cores, one or more GPUs, etc.). Computer-executable instructions or firmware implementations of the processing unit(s) can include computer-executable or machine-executable instructions written in any suitable programming language to perform the various operations, functions, methods, and/or processes described herein. The memory can store program instructions that are loadable and executable on the processing unit(s), as well as data generated during the execution of these programs. The memory can be volatile (such as random access memory (RAM)) and/or non-volatile (such as read-only memory (ROM), flash memory, etc.). The memory can be implemented using any type of persistent storage device, such as computer-readable storage media. In some examples, computer-readable storage media can be configured to protect a computer from an electronic communication containing malicious code. The computer-readable storage media can include instructions stored thereon, that when executed on a processor, perform the operations described herein.

Some or all the elements of the communication interface environment 100 can also include or be coupled to additional storage, which can be implemented using any type of persistent storage device, such as a memory storage device or other non-transitory computer-readable storage medium. In some examples, local storage can include or implement one or more databases (e.g., a document database, a relational database, or other type of database), one or more file stores, one or more file systems, or any combination thereof. The memory and the additional storage are all examples of computer-readable storage media. For example, computer-readable storage media can include volatile or non-volatile, removable or non-removable media implemented in any method or technology for storage of information such as computer-readable instructions, data structures, program modules, or other data.

The computing device 104 can be a user-operated computing device that can be implemented using hardware, firmware, software, or any combination thereof. For example, computing device 104 can be a client device, including, without limitation, a desktop computer, a laptop computer, a tablet computer, a smart phone, a wearable computing device, a personal digital assistant, and so on. The computing device 104 can be implemented as a client accessing a service and/or the application 106. The computing device 104 can include one or more memory storage devices and one or more processors. The computing device 104 can include different kinds of operating systems. A memory storage device can be accessible to the processor(s) and can include instructions stored thereon which, when executed by the processor(s), cause the processor(s) to implement one or more operations, methods, or processes disclosed herein. The memory storage can operate as local storage. Local storage can be implemented using any type of persistent storage device, such as a memory storage device or other computer-readable storage medium. In some examples, local storage can include or implement one or more databases (e.g., a document database, a relational database, or other type of database), one or more file stores, one or more file systems, or any combination thereof. The local storage can store enterprise data.

The computing device 104 can include an interface, e.g., a communication system interface 108. The communication system interface 108 can include a physical interface, a graphical interface (e.g., a graphical user interface), or a combination thereof. All or part of the communication system interface 108 can be provided by the communication system 120. A graphical interface of the communication system interface 108 can be generated by the computing device 104, received from the communication system 120, or a combination thereof. The communication system interface 108 can be provided by the communication system 120 via a network as part of a service (e.g., a cloud service) or application.

In some examples, the communication system interface 108 can enable a user to communicate with the computer system 130 via the communication system 120. Requests and/or responses can communicated through the communication system interface 108. The application 106 can be configured to communicate with the communication system 120 via the communication system interface 108. In various examples, the computing device 104 can be configured to execute and operate one or more applications such as a web browser, a client application, a proprietary client application, or the like. The applications can include specific applications configured for enterprise data and/or services provided by an enterprise computer system. Client applications can be accessible or operated via one or more network(s). Applications can include a graphical user interface (GUI) for operating the application.

The communication system interface 108 can include functional blocks or modules, each of which can be configured to handle communications for a client, e.g., communications with the communication system 120. Communication can be facilitated using a communication protocol (e.g., HTTP in accordance with REST) supported by the computing device 104.

The computing device 104 and the computer system 130 can communicate with the communication system 120 via a callable interface 122. The callable interface 122 can be configured to communicate using a protocol supported by the entity with which the communication system 120 is communicating. The callable interface 122 can include an application programming interface (API). The callable interface 122 can enable clients to communicate with the computer system 130 without having to adapt to differences in protocols (e.g., communication or development protocols) and/or architectural styles or formats. As discussed further below, the communication system 120 can store data that indicates a mapping between communication protocols and various systems and/or devices in the communication interface environment 100.

The computing device 104 can communicate with the communication system 120 via one or more communication networks 110. The communication system 120 can communicate with the computer system 130 via one or more communication networks 112. Examples of communication networks can include a mobile network, a wireless network, a cellular network, a local area network (LAN), a wide area network (WAN), other wireless communication networks, or any combination thereof.

In at least one example, a user 102 operating the computing device 104 to communicate requests to and receive responses from the computer system 130 via the communication system 120. The computing device 104 can communicate a request to the communication system 120 via the callable interface 122. The request can have a format according to a first communication protocol. Upon receiving the request, the communication system 120 can process the request to generate a request in a second format according to a second communication protocol supported by the computer system 130. The request can be generated based on the operation specified in the request received from the computing device 104. The communication system 120 can send the generated request to the computer system 130. The computer system 130 can process the request received from the communication system 120 and perform an operation that is requested. The computer system 130 can send the result of the operation in a response according to the second format supported by the computer system 130. The communication system 120 can process the response and generate a new response based on the contents of the response received from the computer system 130. The new response can be sent to the computing device 104. Further described below is an example of the communication interface environment 100 in operation.

Some examples, such as those described with reference to FIGS. 2 and 3, can be described as a process which is depicted as a flowchart, a flow diagram, a data flow diagram, a structure diagram, a sequence diagram, or a block diagram. Although a sequence diagram or a flowchart can describe the operations as a sequential process, many of the operations can be performed in parallel or concurrently. In addition, the order of the operations can be re-arranged. A process is terminated when its operations are completed, but could have additional steps not included in a figure. A process can correspond to a method, a function, a procedure, a subroutine, a subprogram, etc. When a process corresponds to a function, its termination can correspond to a return of the function to the calling function or the main function.

The processes depicted herein, such as those described with reference to FIGS. 2 and 3, can be implemented in software (e.g., code, instructions, program) executed by one or more processing units (e.g., processors cores), hardware, or any combination thereof. The software can be stored in a memory (e.g., on a memory device, on a non-transitory computer-readable storage medium). In some examples, the processes depicted in flowcharts herein can be implemented in the system described with respect to FIG. 1. The particular series of processing steps in this disclosure are not intended to be limiting. Other sequences of steps can also be performed according to alternative examples. For example, alternative examples of the present disclosure can perform the steps outlined above in a different order. Moreover, the individual steps illustrated in the figures can include multiple sub-steps that can be performed in various sequences as appropriate to the individual step. While processing depicted in FIGS. 2 and 3 can be described with respect to accessing a single request or a single response, such processing can be performed for multiple requests and responses, in any number of combinations. Furthermore, additional steps can be added or removed. One of ordinary skill in the art would recognize many variations, modifications, and alternatives.

Figure 2:
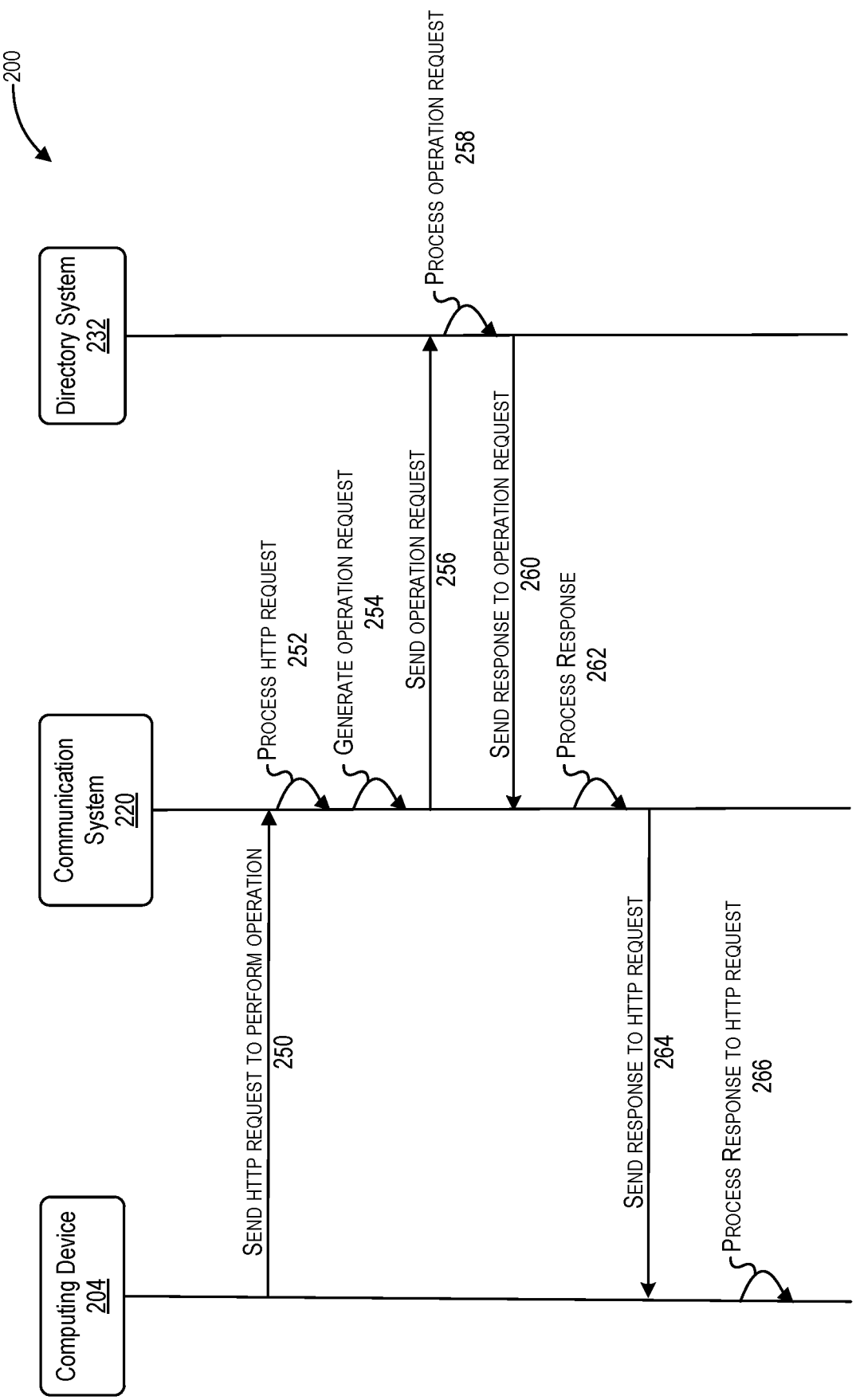
FIG. 2 illustrates a sequence diagram for facilitating communication with a directory system, according to some embodiments.
Figure 3:
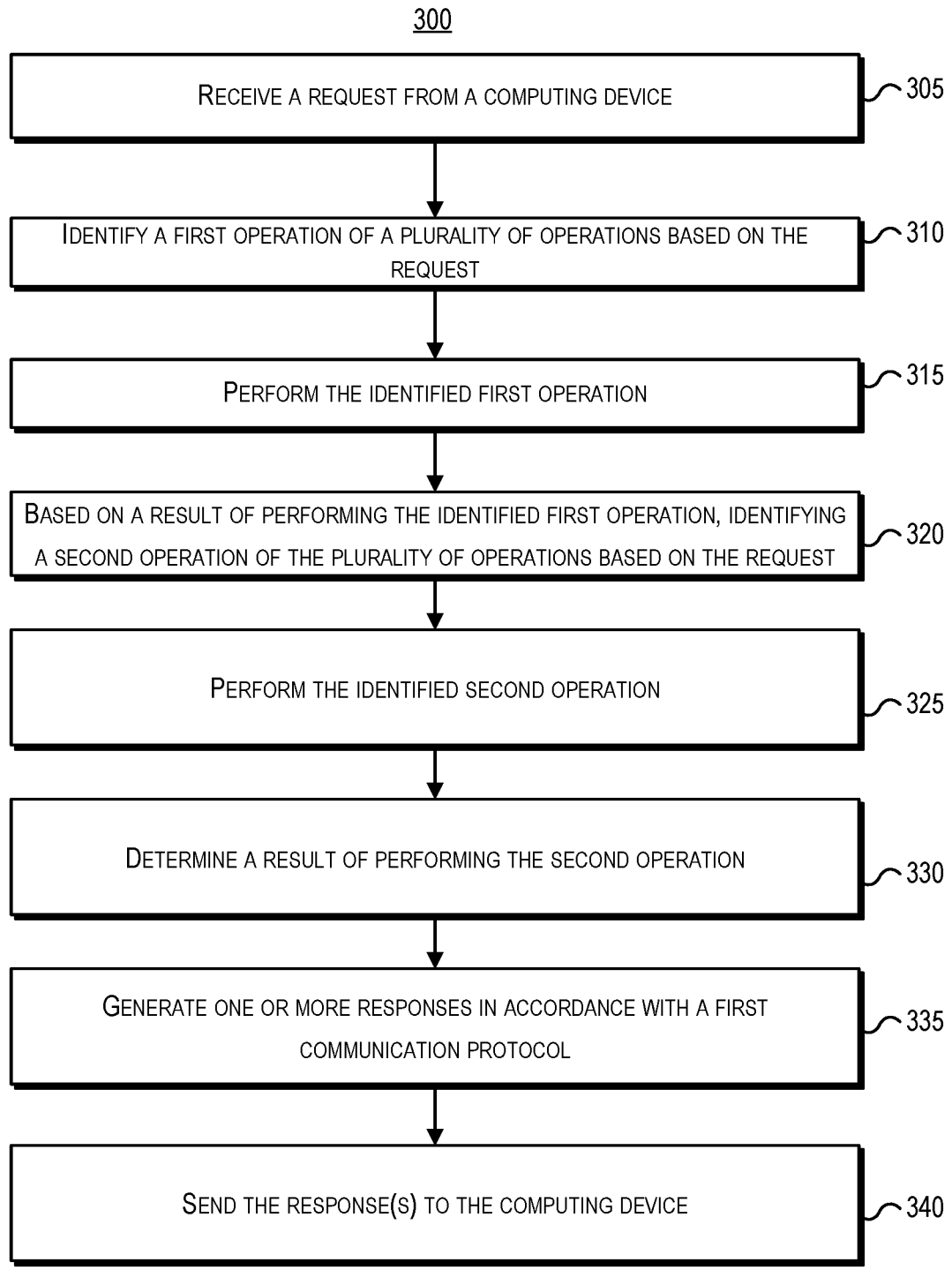
FIG. 3 illustrates a flowchart of a process for facilitating communication with a directory system, according to some embodiments.

In an aspect of some examples, each process in FIGS. 2 and 3 can be performed by one or more processing units. A processing unit can include one or more processors, including single core or multicore processors, one or more cores of processors, or any combination thereof. In some examples, a processing unit can include one or more special purpose co-processors such as graphics processors, digital signal processors (DSPs), or the like. In some examples, some or all of processing units can be implemented using customized circuits, such as application specific integrated circuits (ASICs), or field programmable gate arrays (FPGAs).

FIG. 2 illustrates a sequence diagram 200 for facilitating communication with a directory system 232, according to some embodiments. Specifically, sequence diagram 200 shows how a computing device 204 can communicate with the directory system 232 through a communication system 220. The computing device 204 can include an interface (e.g., communication system interface 108) that is configured for communication with communication system 220. In some examples, the computing device 204 can include the interface. In other examples, the interface can be included in an application (e.g., application 106) executing on the computing device 204.

Starting at step 250, the computing device 204, using the interface, can send a request to the communication system 220 to perform one or more operations on a resource at directory system 232. In some examples, the request can be addressed to a URL associated with the resource. In some examples, the request can be in a format according to a communication protocol supported by the computing device 204 (e.g., HTTP). The HTTP request can be in accordance with REST.

In some examples, the request can be associated with a method. The type of method can depend on the communication protocol used. For example, for HTTP supporting REST, the method can include at least one or more of GET, POST, PATCH, and DELETE methods (sometimes referred to as HTTP methods). A person ordinary skill in the art will recognize that the method can be other types.

In some examples, the HTTP request can include a payload (in a format such as JSON) that indicates the one or more operations to perform on the resource. In such examples, the communication system 220 can process the HTTP request to extract the one or more operations to be performed by the resource. The operation(s) can be determined based on at least one or more of the method, the payload, or any combination thereof. In some examples, an LDAP entry can be represented in JSON.

For example, an HTTP POST payload for an LDAP ADD operation can be:

```
{
    "msgType":"urn:ietf:params:rest:schemas:oracle:oud:1.0:AddRequest",
    "dn": "uid=bjensen, d c =example,dc=com",
    "attributes": {
        "uid":"bjensen",
        "userpassword":"password",
        "cn":"Ms. Barbara J Jensen III",
        "sn": "Jensen",
        "givenName": "Barbara",
        "objectclass": ["to", "person", "inetorgperson"]
    }
}
```

To avoid having sensitive data in a URL portion of the request, a method in the request can include operation-specific data that is the payload of the request. The payload can include one or more attributes that map to one or more attributes of a schema definition for an operation to perform on directory system 232. For example, an HTTP request can include a payload that defines attributes that map to attributes in a schema definition for directory system 232. A payload of a request can include one of several message types to specify the attributes of a schema definition defined by a target system such as directory system 232. Examples of message types can include AddRequest, ModifyDNRequest, SearchRequest, AddResponse, ModifyDNResponse, SearchResponse, ModifyRequest, CompareRequest, ExtendedOperationRequest, ModifyResponse, CompareResponse, ExtendedOperationResponse, DeleteRequest, and ErrorResponse. Each of the message types can correspond to an operation to perform at directory system 232. The following is an example of a payload of a method in a request:

```
"msgType": "urn:ietf:params:rest:schemas:oracle:oud:1.0:<msgType>",
<request payload for the message>
```

Each of the message types can correspond to an operation recognized by directory system 232. The attributes in the payload can correspond to one or more attributes of a request in a format of a communication protocol supported by directory system 232. An LDAP entry can be represented in JSON with the following format, with the entry mapped to its specific type using its object class definitions, as follows:

```
{
    "dn": "<entry DN>",
    "attributes": {
        "attr1":"value1",
        "attr2":"value2",
        ...,
        "objectclass":
        [
            "<objectclass>",
            ...
        ]
}
```

In some examples, the payload can include one or more embedded operations. An embedded operation can be an operation that is performed by the communication system 220, rather than the resource. In such examples, the payload can both indicate one or more operations to perform on the resource as well as one or more embedded operations to perform by the communication system 220.

For example of an embedded operation, the payload can include access management information (e.g., an authentication token) for access management. A token can allow for determining access of a user (e.g., authentication) for a request. For example, communication system 220 can communicate (e.g., send an authentication request) with an access management system of an identity management system to determine authentication of the user based on the token received in the payload. Therefore, rather than the computing device 204 having to communicate with an access management system to authenticate a user, the authentication can be performed by the communication system 220 as part of a process initiated based on the request.

Such techniques can minimize communications sent to/from the computing device 204, thereby improving processing performance of a system. In addition, the computing device 204 does not need to wait for a successful authentication before sending a request to a directory system. Instead, the directory system can determine authentication as well as perform the request. In addition, the inclusion of a token in the payload can provide improved access management on a per-request basis. For example, each request can be authenticated rather than having to rely on a possibly outdated authentication.

The techniques for specifying information in a request can be defined by an interface of communication system 220, e.g., callable interface 122. In some examples, callable interface 122 can be configured for multiple modes of operation. A mode of communication can be configured by providing a mode configuration parameter to communication system 220 or by indicating the mode configuration parameter in the request. In at least one mode, a request can be submitted using a single function, with one or more operations indicated in a payload of the request. For example, the mode configuration parameter can include: 1) a REST-mode, and 2) a POST-mode when computing device 204 supports an HTTP communication configured for REST. In POST-mode, requests received via callable interface 122 can be submitted as POST requests only. In REST-mode, requests can be submitted as one of many types of requests including an HTTP GET request, an HTTP POST request, an HTTP PATCH request, or an HTTP DELETE request. The mode can be configured as a parameter defined by the callable interface 122.

At step 252, communication system 220 can receive the request sent at step 250 using callable interface 122. Communication system 220 can identify a type of the request based on the format for the request. The type of request can correspond to a method indicated in the format of the request. Examples of types of requests can include an HTTP GET, an HTTP POST, an HTTP PATCH, or an HTTP DELETE. As explained above, a type of request can be mapped to a method supported by the communication protocol of computing device 204. The type of request can be identified based on a mode for handling the request. Communication system 220 can determine a mode for the request, such as whether the mode is a POST mode or a REST mode when HTTP communication is supported. In some examples, requests received via the API of the communication interface can use a HTTP POST while in the POST mode. In some examples, requests can be submitted as one of an HTTP GET, an HTTP POST, an HTTP PATCH, or an HTTP DELETE while in the REST mode. In one illustrative example of a REST mode, an HTTP verb (sometimes referred to as an HTTP method) can be mapped to an equivalent LDAP operation for all interactions in the REST mode. For example, an HTTP POST can perform an LDAP add, and an HTTP DELETE can perform an LDAP delete. Likewise, HTTP GET and HTTP PATCH can be used to perform LDAP searches and LDAP modifications respectively.

Communication system 220 can process the request to determine information included in the request. The information can be used to determine the type of the request. For example, when the request is in the POST mode, communication system 220 can parse the payload of the request to determine a message type and one or more attributes in the payload. In some examples, communication system 220 can determine that multiple operations are specified in the payload, as indicated by each message type and one or more attributes for the message type. An order of the operations can be determined based on the order indicated in the payload. Communication system 220 can determine the type of request based on a mapping of a message type to an operation at directory system 232. The payload can be parsed to identify one or more attributes for the request that define the operation.

In some examples, the payload can be configured to specify multiple operations. Some or all of the operations can depend on each other. For examples, a second operation can be performed after a first operation is performed. Any combination of operations can be performed according to a sequence and/or based on a result of performing some of the operations. For example, a second operation be performed based on a result of a first operation.

To illustrate multiple operations in a single request, a first operation can be a search operation. A second operation can be a delete operation. The delete operation can delete the result of the search operation (e.g., search all entries under dc=example,dc=com" and delete them.). In some examples, a GET method would be used for the search operation (e.g., GET for /rest/directory/dc=example,dc=com). In such examples, for each item returned by the search, a DELETE method can be used (which may contain n network calls for n items returned from search). In other examples, a DELETE method can include a search operation (e.g., DELETE /rest/directory/base="dc=example, dc=com"&searchfilter="& . . . "). In such examples, a SEARCH method might not be explicit in the request as there is not a SEARCH operation payload; however, a search operation is still performed by bundling the two operations together. In such an illustration, a single request can be sent that causes the resource to first search for one or more entries and then delete the entries that are found.

By allowing multiple operations, less requests need to be sent from the computing device 204. Previously, a request would have to be sent for the search operation, and then, with the results of the search operation, a request with a delete operation would be sent. For another example, a request can be sent for a modify operation, and then, with the results of the modify operation, a request with an add operation can be sent. For another example, a request can be sent for a modify operation, and then, with the results of the modify operation, a request with a compare operation can be sent. For another example, a request can be sent for a search operation, and then, with the results of the search operation, a request with a modify operation can be sent. For another example, a request can be sent for a search operation, and then, with the results of the search operation, a request with a modify operation can be sent, and then, with the results of the modify operation, a request with an add operation can be sent.

At step 254, communication system 220 can generate one or more requests to perform one or more operations identified in the request received from computing device 204. The operation to be performed on the resource can be determined based on the method determined from the request received from computing device 204. As explained above, a method can be mapped to one or more operations in a format of a protocol supported by directory system 232. For example, for HTTP, the method can include one or more GET, POST, PATCH, and DELETE methods, each of which corresponds to a type of request provided by HTTP that supports REST. The method can be determined based on the type of request. Examples of types of requests include an HTTP GET request, an HTTP POST request, an HTTP PATCH request, or an HTTP DELETE request.

Communication system 220 can generate a request according to the operations defined by the communication protocol supported by directory system 232. The request can be generated to perform an operation for the type of request determined at step 252. A format of the request can be defined according to the format of the communication protocol supported by directory system 232. For example, communication system 220 can generate a request according to LDAP, where directory system 232 supports LDAP. For example, an LDAP add request can be defined as follows:

```
AddRequest ::= [APPLICATION 8] Sequence    {
    entry              LDAPDN,
    attributes         AttributeList        }
```

The request can be generated based on the operation identified in the request. In some examples, where a request indicates multiple operations based on the payload of the request, communication system 220 can generate multiple requests, one for each of the operations indicated by the request. The requests can be sent in an order indicated by an order of the operations in the payload of the request.

As described above, multiple operations can be included in the request from the computing device 204. In such examples, the communication system 220 can generate multiple requests for the directory system 232. In some examples, a second request to the directory system 232 can depend on a result of a first request to the directory system 232. In such examples, the second result can be generated after the result is received by the communication system 220. In at least one embodiment, the sequence of operations in diagram 200 may include multiple sets of operations including steps 256, 258, and 260. In some examples, a single request may be sent and multiple responses may be received. The request may indicate multiple operations, and the responses may correspond to each of the operations. In some examples, multiple requests may be sent and a single response may be received for the requests.

In at least one embodiment, at step 256, communication system 220 can send the generated requests to directory system 232. The requests can be sent according to an order of the operations received from computing device 204 or an order of the operations indicated in a single request. In some examples, the requests can be sent based on dependencies of the requests. For examples, requests that do not depend on a result of another request can be sent to the directory system 232.

At step 258, directory system 232 can receive each of the requests sent by communication system 220. Requests can be processed in the order received. Directory system 232 can parse each request to determine an operation to perform on a resource as indicated by request at step 250. The request can be received in a format of a communication protocol supported by directory system 232. Therefore, directory system 232 can process the request according to the format specified in the request. Processing a request can include performing one or more operations indicated in the request and determining a result of the operations that are performed.

At step 260, directory system 232 can send one or more responses to communication system 220. Each response can indicate a result of an operation performed for a request. The response can be sent in a format supported by directory system 232. Therefore, an existing directory system 232 might not need to be configured to communicate with computing device 204. A response can include an error code, information for tracking an operation, or other information about an operation that is performed. For example, a response to an LDAP add request can be defined as follows: AddResponse::=[APPLICATION 9] LDAPResult.

At step 262, communication system 220 can process each of the responses received from directory system 232. Processing a request can include parsing the request based on the format of the communication protocol supported by directory system 232. Communication system 120 can be configured to process responses from directory system 232 having a format of a communication protocol supported by directory system 232. In some examples, callable interface 122 can include a routine that can be invoked by directory system 232 to communicate a response.

Upon processing a response, communication system 220 can generate a response to indicate a result of an operation performed for a request received at step 252. A response can be generated in a format of a communication protocol (e.g., HTTP) supported by computing device 204. For example, a response can be generated in the same format in which a request is received at 252. As such, according to an HTTP format, a response can be formatted as a response based on a type of request received from computing device 204. In some examples, a response can include a payload that indicates the result of an operation. The payload of a response can include attributes and a message type as indicated in a request received at step 252. A response can include a payload based on the mode indicated for the request received at step 252. For examples, a response to an add operation can be the result of the add operation or HTTP 204/NO CONTENT if the operation fails. The result can be returned in the response's payload as follows:

```
{
    "msgType":
    "urn:ietf:params:rest:schemas:oracle:oud:1.0:AddResponse].
    {
        "dn": "<dn>",
        "entry":
        {
            ...
        }
    }
}
```

In some examples, a response can include multiple results, each corresponding to a different operation that is performed. A result of an operation indicated in a response can include data received in a response from directory system 232 for the operation.

At step 264, communication system 220 can send one or more responses, each corresponding to at least one operation performed at directory system 232 for a request received at step 250. In some examples, a response can be sent to computing device 204 via callable interface 122.

At step 266, computing device 204 can receive and process each response sent by communication system 220. Computing device 204 can process a response by parsing the response according to a format of a protocol supported by computing device 204. A payload of a response can be parsed to identify the result of an operation performed by directory system 232. A response can include information indicating an operation requested at step 250. The information can be used to track and associate the response with the operation that is requested. A response can be formatted based on an operation requested at step 250. A response can be parsed following the conventions of callable interface 122 by which indicate a format of a response. Computing device 204 can perform one or more operations based on determining the result of an operation.

Examples of requests from the computing device 204 will now be described. An LDAP search can include a base (e.g., a distinguished name of the base), a scope (e.g., a search scope out of base), a search filter (e.g., a LDAP search filter), one or more attributes, a dereference policy (e.g., never, search, find, or always), or any combination thereof. If an operation is indicated in a URL query, the base can be specified by appending the distinguished name to the URL (e.g., GET/directory/<DN>). The other LDAP search parameters can be specified on the URL:

```
GET /directory
    ?scope=<scope>
    &filter="objectclass=*"
    &requiredAttribute="*"
    &dereferencePolicy="never"
    &controls="pageViewControl: 1:100"
```

In such an example, if the base is not specified, the search can be done on a null distinguished name. If the scope is not specified, the search can be done on a whole subtree if no distinguished name is specified (otherwise on the base entry). If no search filter is specified, the search can be done on "objectclass=*". If dereferencePolicy is not specified, it can default to "never."

If an operation is indicated in a payload of a request, the URL parameters can be ignored. For example, the request can be:

```
POST /directory
{
    "msgType'": "urn: ietf: params : rest : schemes : oracle : oud : 1 . 0 :
    SearchRequest",
    "base": " <base DN>",
    " scope": " <base |one|sub|subordinates>",
    "filter": "<filter>",
    "attributes" : "<attributes >",
    "dereferencePolicy": "never| search| find|always"
    //Controls , if any.
    "controls": [
        "<control>",
        ...
    ]
}
```

For another example, an LDAP compare can be mapped to A POST operation, such as:

```
POST /directory
{
    "msgType": "urn: ietf: params : rest : schemas : oracle: oud: 1. 0 :
    CompareRequest",
```

-continued

```
    "dn": " <DN of the entry>",
    "assertion": "<assertion>",
    "controls": [
        "<control>",
        ...
    ]
}
```

In such an example the DN of the entry can be a distinguished name of an entry that will be compared. The assertion can be an assertion that will be used for comparison.

For another example, an LDAP add can mapped to A POST operation, such as:

```
{
    "msgType": "ucn : ietf : params : rest: schemas : oracle : oud : 1 . 0 :
    AddRequest",
    "dn": " <dn>",
    "attributes":
    {
        ...
    },
    "controls": [
        "<control>",
        ...
    ]
}
```

In such an example, the do can be a distinguished name of an entry to add. The attributes can be attributes of an entry to add.

For another example, an LDAP Modify operation can use a PATCH, such as:

```
PATCH / directory/<dn>
{
    "msgType": "urn : ietf: params : rest: schemas : oracle : oud: 1. 0 :
    Modify Request",
    "operations":
    [
        {
            "opType": "<add| delete |replace|increments >"
            "attribute" : "<attribute to modify>" ,
            "values": [ <one or more values> ]
        },
        ...
    ],
    "controls": [
        "<control >",
        ...
    ]
}
```

In such an example, multiple modifications for an entry can be done using an array values of operations. Type can define the various modifications that may be allowed by the server.

For another example, an LDAP Modify operation can use a POST, such as:

```
POST I di rectory
{
    "msgType": "urn: ietf : params : rest : schemas : oracle : oud : 1 . 0 :
    ModifyRequest",
    "dn": "<DN of the entry>",
    "operations":
```

```
[
    {
        "opType": "<add|delete|replace|increments>"
        "attribute": "<attribute to modify>",
        "values": [ <one or more values> ]
    },
    ...
],
"controls": [
    "<control >",
    ...
]
}
```

FIG. 3 illustrates a flowchart of a process 300 for facilitating communication with a directory system, according to some embodiments. In some aspects, the process 300 can be performed by a communication system. While specific examples might be given of a communication system (or a computer system), one of ordinary skill in the art will appreciate that other devices can be included in the process 300.

Process 300 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 300 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 305, the process 300 includes receiving a request from a computing device (e.g., the computing device 204). In some examples, the request can be received by a first computer system (e.g., a communication system 220). In some examples, the request can indicate a plurality of operations to be performed. In such examples, the request can be in accordance with a first communication protocol. In some examples, the first communication protocol can be hypertext transfer protocol (HTTP) or HTTP supporting Representational State Transfer (REST). In some examples, the computing device can support the first communication protocol. In such examples, the communication system can include a programming interface to receive the request (which can be in accordance with the first communication protocol) from the computing device. In such examples, the programming interface can also provide a response (which can be in accordance with the first communication protocol) to the computing device for the request. In some examples, the request can include a payload that defines one or more operations to be performed on one or more resources. In some examples, the payload can be formatted using JavaScript Object Notation (JSON).

In examples when the request is in accordance with HTTP, the request can be associated with a HTTP method. In some examples, the HTTP method can be in accordance with REST. In such examples, the HTTP method can include one of a GET method, a POST method, a PATCH method, or a DELETE method. When a HTTP method is used, the process 300 can further include determining a mode for the request. In some examples, the request can be configured according to the mode. In such examples, the mode can either be a POST mode or a REST mode. In some examples, the POST mode can include a single HTTP method (e.g., a POST method). In some examples, the REST mode can include a plurality of HTTP methods (e.g., a GET method, a POST method, a PATCH method, a DELETE method, or any combination thereof). In one illustrative example of a REST mode, an HTTP verb (sometimes referred to as an HTTP method) can be mapped to an equivalent LDAP operation for all interactions in the REST mode. For example, an HTTP POST can perform an LDAP add, and an HTTP DELETE can perform an LDAP delete. Likewise, HTTP GET and HTTP PATCH can be used to perform LDAP searches and LDAP modifications respectively. In some examples, the mode can be configured as a parameter defined by the communication interface.

At step 310, the process 300 can further identifying a first operation of the plurality of operations based on the request. In some examples, the first operation can be in accordance with a second communication protocol that is supported by a second computer system. In such examples, the second communication protocol can be different from the first communication protocol. In some examples, the operations can be intended to be executed on one or more resources. In such examples, the second operation can depend on a result of the first operation. In some examples, each operation may be performed on the same resource or a different resource. It is contemplated that more or less operations can be included in the request. In some examples, identifying can include processing (or parsing) the request to identify the operations.

At step 315, the process 300 further includes performing the identified first operation. In some examples, the identified first operation can be performed by the second computer system. In some examples, performing the identified first operations can include generating a request that includes the first operation in accordance with a second communication protocol (e.g., lightweight directory access protocol (LDAP). In some examples, the second communication protocol can be supported by a computer system (e.g., the directory system 232). In other examples, the communication system and the computer system can be the directory system 232.

At step 320, the process 300 further includes, based on a result of performing the identified first operation, identifying a second operation of the plurality of operations based on the request. In some examples, the second operation can be in accordance with a second communication protocol. In some examples, performing the identified first operation can include sending the identified first operation to a resource of the computer system. In such examples, receiving the identified first operation can cause the resource to perform the identified first operation. In some examples, the resource can be associated with a uniform resource identifier (URI) (e.g., a uniform resource locator (URL) or a uniform resource name (URN)). In such examples, the identified first operation can be addressed to the URI when sent to the resource. In some examples, a result of the identified first operation can be maintained on the computer system. In other examples, the result of the identified first operation can be sent to the communication system in accordance with the second communication protocol. In other examples, the result of the identified first operation can cause a flag to be set or sent to the communication system indicating that the first operation has been performed. In such examples, the communication system can obtain the result of performing the identified first operation.

At step 325, the process 300 further includes performing the identified second operation. In some examples, the second computer system can perform the identified second operation. In some examples, performing the identified second operation can include generating a request that includes the identified second operation in accordance with the second communication protocol. In some examples, the identified second operation can be identified in the request as described above. In some examples, the identified second operation can be in accordance with a third communication protocol. In some examples, the third communication protocol can be supported by a different resource than the second communication protocol. In other examples, the third communication protocol can be supported by a different computer system than the computer system. In some examples, the identified second operation can be based on the result of performing the identified first operation. In such examples, the identified second operation can include at least a portion of the result of performing the identified first operation.

At step 330, the process 300 further includes determining a result of performing the identified second operation. In some examples, the result can be determined by the first computer system. In some examples, determining the result of performing the identified second operation can include receiving the result of performing the identified second operation from the resource. In such examples, the result of performing the identified second operation can be in accordance with the second communication protocol. In other examples, receiving the result of performing the identified second operation can include a flag being set or sent to the communication system indicating that the identified second operation has been performing. In such examples, the communication system can obtain the result of performing the identified second operation.

At step 340, the process 300 further includes generating one or more responses (e.g., a response) in accordance with the first communication protocol. In some examples, the first computer system can generate the response. In some examples, the response can include the result of performing the plurality of operations indicated by the request. In some examples, the response can indicate the result of performing the identified second operation. In such examples, the response can be generated by the communication system. In some examples, other operations can be sent to be executed by the computer system before the response is generated. In some examples, the response can be generated when all of the operations have been performed by the computer system. In other examples, the response can be generated as operations are performed by the computer system. In some examples, separate responses can be generated for separate operations (e.g., an operation can be separate because it does not depend on any more operations or an operation can be separate because it is a different operation).

At step 345, the process 300 further includes sending the response(s) to the computing device. In some examples, the first computer system can send the response. In some examples, responses can be sent as they are generated. In other examples, a single response can be generated and sent with all of the results from the request. In some examples, multiple requests can be combined in a single response. In other examples, multiple responses can be sent for a single operation and/or request.

Figure 4:
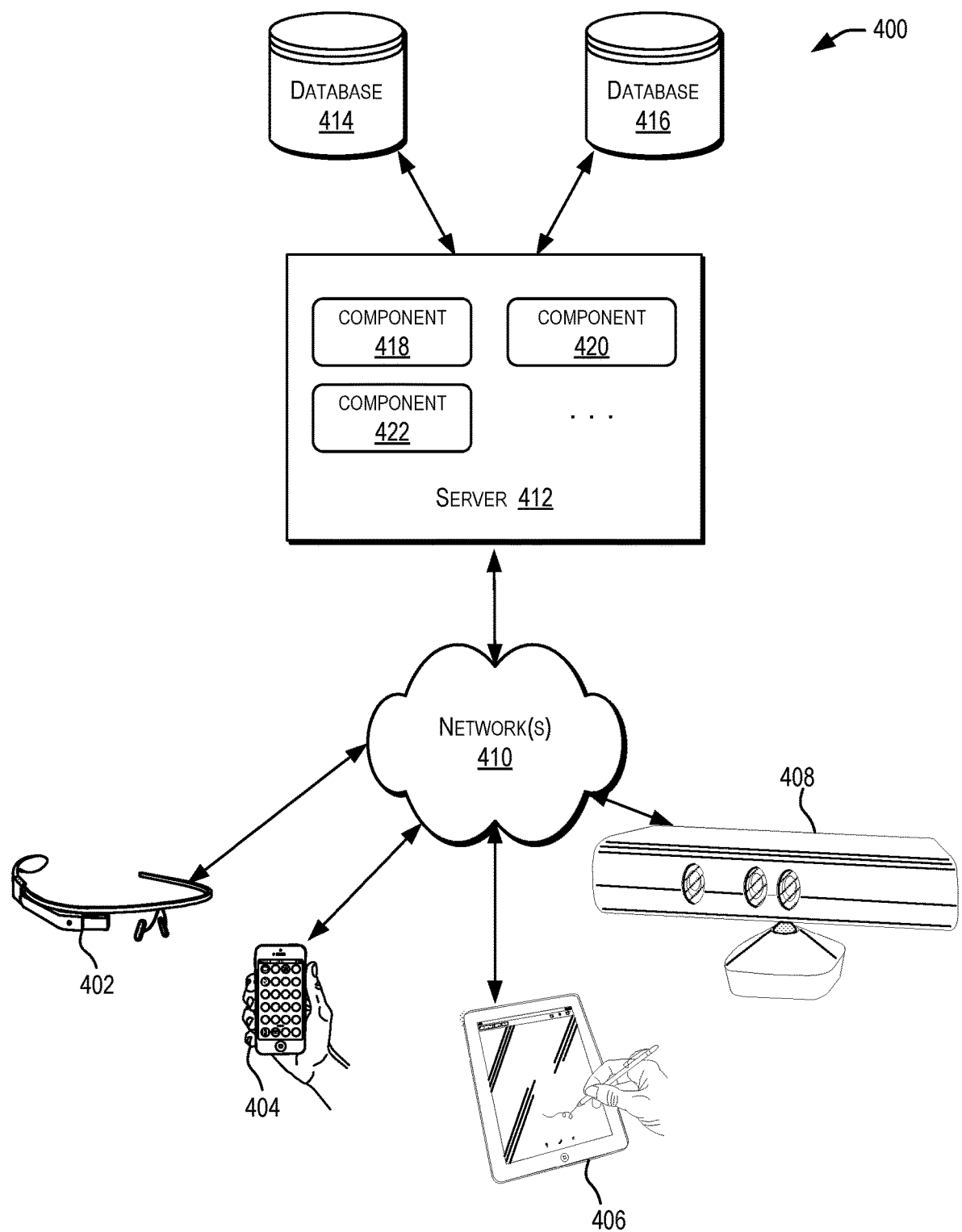
FIG. 4 depicts a simplified block diagram of a distributed system.

FIG. 4 depicts a simplified diagram of a distributed system 400. In the illustrated example, distributed system 400 includes one or more client computing devices 402, 404, 406, and 408, which are configured to execute and operate a client application such as a web browser, proprietary client (e.g., Oracle Forms), or the like over one or more network(s) 410. Server 412 can be communicatively coupled with remote client computing devices 402, 404, 406, and 408 via network 410.

In various examples, server 412 can be adapted to run one or more services or software applications. In certain examples, server 412 can also provide other services or software applications can include non-virtual and virtual environments. In some examples, these services can be offered as web-based or cloud services or under a Software as a Service (SaaS) model to the users of client computing devices 402, 404, 406, and/or 408. Users operating client computing devices 402, 404, 406, and/or 408 can in turn utilize one or more client applications to interact with server 412 to utilize the services provided by these components.

In the configuration depicted in FIG. 4, software components 418, 420 and 422 of system 400 are shown as being implemented on server 412. In other examples, one or more of the components of system 400 and/or the services provided by these components can also be implemented by one or more of the client computing devices 402, 404, 406, and/or 408. Users operating the client computing devices can then utilize one or more client applications to use the services provided by these components. These components can be implemented in hardware, firmware, software, or any combination thereof. It should be appreciated that various different system configurations are possible, which can be different from distributed system 400. The example shown in FIG. 4 is thus one example of a distributed system for implementing an example system and is not intended to be limiting.

Client computing devices 402, 404, 406, and/or 408 can include various types of computer systems. For example, a client computing device can include portable handheld devices (e.g., an iPhone®, cellular telephone, an iPad®, computer tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices can support various applications such as various Internet-related apps, e-mail, short message service (SMS) applications, and can use various other communication protocols. The client computing devices can also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices can also include electronic devices such as a thin-client computer, an Internet-enabled gaming system (e.g., a Microsoft Xbox gaming console with or without a Kinect® gesture input device), and/or a personal messaging device, capable of communicating over network(s) 410.

Although distributed system 400 in FIG. 4 is shown with four client computing devices, any number of client computing devices can be supported. Other devices, such as devices with sensors, etc., can interact with server 412.

Network(s) 410 in distributed system 400 can be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 412 can be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 412 can include one or more virtual machines running virtual operating systems, or other computing architectures involving virtualization. One or more flexible pools of logical storage devices can be virtualized to maintain virtual storage devices for the server. Virtual networks can be controlled by server 412 using software defined networking. In various examples, server 412 can be adapted to run one or more services or software applications described in the foregoing disclosure. For example, server 412 can correspond to a server for performing processing as described above according to an example of the present disclosure.

Server 412 can run an operating system including any of those discussed above, as well as any commercially available server operating system. Server 412 can also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 412 can include one or more applications to analyze and consolidate data feeds and/or event updates received from users of client computing devices 402, 404, 406, and 408. As an example, data feeds and/or event updates can include, but are not limited to, Twitter® feeds, Facebook® updates or real-time updates received from one or more third party information sources and continuous data streams, which can include real-time events related to sensor data applications, financial tickers, network performance measuring tools (e.g., network monitoring and traffic management applications), clickstream analysis tools, automobile traffic monitoring, and the like. Server 412 can also include one or more applications to display the data feeds and/or real-time events via one or more display devices of client computing devices 402, 404, 406, and 408.

Distributed system 400 can also include one or more databases 414 and 416. These databases can provide a mechanism for storing information such as user interactions information, usage patterns information, adaptation rules information, and other information used by examples of the present disclosure. Databases 414 and 416 can reside in a variety of locations. By way of example, one or more of databases 414 and 416 can reside on a non-transitory storage medium local to (and/or resident in) server 412. Alternatively, databases 414 and 416 can be remote from server 412 and in communication with server 412 via a network-based or dedicated connection. In one set of examples, databases 414 and 416 can reside in a storage-area network (SAN). Similarly, any necessary files for performing the functions attributed to server 412 can be stored locally on server 412 and/or remotely, as appropriate. In one set of examples, databases 414 and 416 can include relational databases, such as databases provided by Oracle that are adapted to store, update, and retrieve data in response to SQL-formatted commands.

Figure 5:
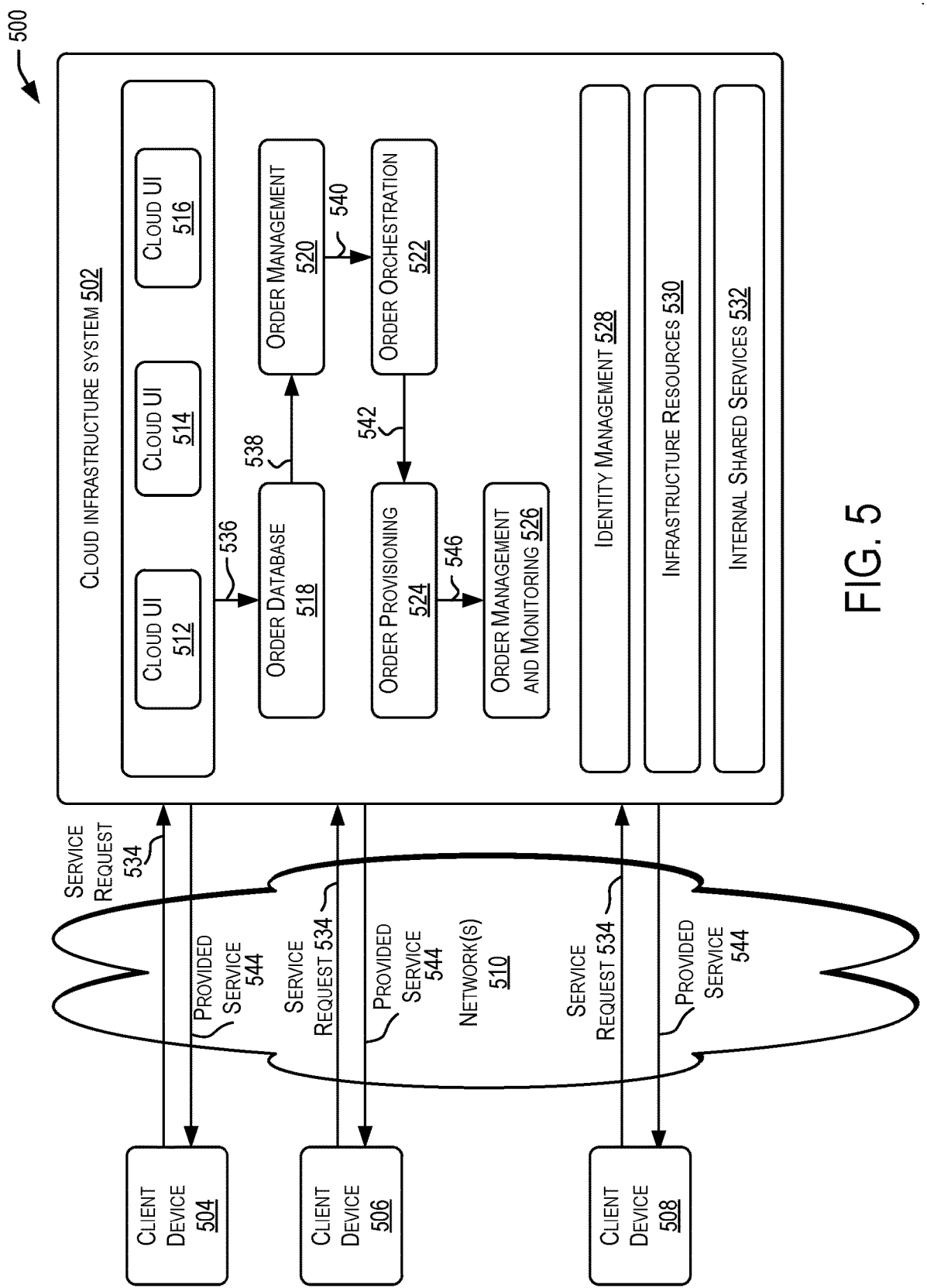
FIG. 5 illustrates a simplified block diagram of one or more components of a system environment in which services can be offered as cloud services.

In some examples, a cloud environment can provide one or more services. FIG. 5 is a simplified block diagram of one or more components of a system environment 500 in which services can be offered as cloud services. In the illustrated example in FIG. 5, system environment 500 includes one or more client computing devices 504, 506, and 508 that can be used by users to interact with a cloud infrastructure system 602 that provides cloud services. Cloud infrastructure system 502 can comprise one or more computers and/or servers that can include those described above for server 412.

It should be appreciated that cloud infrastructure system 502 depicted in FIG. 5 can have other components than those depicted. Further, the example shown in FIG. 5 is only one example of a cloud infrastructure system that can incorporate an example of the disclosure. In some other examples, cloud infrastructure system 502 can have more or fewer components than shown in the figure, can combine two or more components, or can have a different configuration or arrangement of components.

Client computing devices 504, 506, and 508 can be devices similar to those described above for client computing devices 402, 404, 406, and 408. Client computing devices 504, 506, and 508 can be configured to operate a client application such as a web browser, a proprietary client application (e.g., Oracle Forms), or some other application, which can be used by a user of the client computing device to interact with cloud infrastructure system 502 to use services provided by cloud infrastructure system 502. Although exemplary system environment 500 is shown with three client computing devices, any number of client computing devices can be supported. Other devices such as devices with sensors, etc. can interact with cloud infrastructure system 502.

Network(s) 510 can facilitate communications and exchange of data between client computing devices 504, 506, and 508 and cloud infrastructure system 502. Each network can be any type of network familiar to those skilled in the art that can support data communications using any of a variety of commercially-available protocols, including those described above for network(s) 410.

In certain examples, services provided by cloud infrastructure system 502 can include a host of services that are made available to users of the cloud infrastructure system on demand. Various other services can also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain examples, a specific instantiation of a service provided by cloud infrastructure system 502 can be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system can host an application, and a user can, via a communication network such as the Internet, on demand, order and use the application.

In some examples, a service in a computer network cloud infrastructure can include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain examples, cloud infrastructure system 502 can include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 502 can also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an example to relatively quickly focus more (or fewer) computing resources upon an objective, the cloud infrastructure system can be better available to carry out tasks on large data sets based on demand from a business, government agency, research organization, private individual, group of like-minded individuals or organizations, or other entity.

In various examples, cloud infrastructure system 502 can be adapted to automatically provision, manage and track a customer's subscription to services offered by cloud infrastructure system 502. Cloud infrastructure system 502 can provide the cloud services via different deployment models. For example, services can be provided under a public cloud model in which cloud infrastructure system 502 is owned by an organization selling cloud services (e.g., owned by Oracle Corporation) and the services are made available to the general public or different industry enterprises. As another example, services can be provided under a private cloud model in which cloud infrastructure system 502 is operated solely for a single organization and can provide services for one or more entities within the organization. The cloud services can also be provided under a community cloud model in which cloud infrastructure system 502 and the services provided by cloud infrastructure system 502 are shared by several organizations in a related community. The cloud services can also be provided under a hybrid cloud model, which is a combination of two or more different models.

In some examples, the services provided by cloud infrastructure system 502 can include one or more services provided under Software as a Service (SaaS) category, Platform as a Service (PaaS) category, Infrastructure as a Service (IaaS) category, or other categories of services including hybrid services. A customer, via a subscription order, can order one or more services provided by cloud infrastructure system 502. Cloud infrastructure system 502 then performs processing to provide the services in the customer's subscription order.

In some examples, the services provided by cloud infrastructure system 502 can include, without limitation, application services, platform services and infrastructure services. In some examples, application services can be provided by the cloud infrastructure system via a SaaS platform. The SaaS platform can be configured to provide cloud services that fall under the SaaS category. For example, the SaaS platform can provide capabilities to build and deliver a suite of on-demand applications on an integrated development and deployment platform. The SaaS platform can manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services can be provided. Examples include, without limitation, services that provide solutions for sales performance management, enterprise integration, and business flexibility for large organizations.

In some examples, platform services can be provided by cloud infrastructure system 502 via a PaaS platform. The PaaS platform can be configured to provide cloud services that fall under the PaaS category. Examples of platform services can include without limitation services that enable organizations (such as Oracle) to consolidate existing applications on a shared, common architecture, as well as the ability to build new applications that leverage the shared services provided by the platform. The PaaS platform can manage and control the underlying software and infrastructure for providing the PaaS services. Customers can acquire the PaaS services provided by cloud infrastructure system 502 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some examples, platform services provided by the cloud infrastructure system can include database cloud services, middleware cloud services (e.g., Oracle Fusion Middleware services), and Java cloud services. In one example, database cloud services can support shared service deployment models that enable organizations to pool database resources and offer customers a Database as a Service in the form of a database cloud. Middleware cloud services can provide a platform for customers to develop and deploy various business applications, and Java cloud services can provide a platform for customers to deploy Java applications, in the cloud infrastructure system.

Various different infrastructure services can be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain examples, cloud infrastructure system 502 can also include infrastructure resources 530 for providing the resources used to provide various services to customers of the cloud infrastructure system. In one example, infrastructure resources 530 can include pre-integrated and optimized combinations of hardware, such as servers, storage, and networking resources to execute the services provided by the PaaS platform and the SaaS platform, and other resources.

In some examples, resources in cloud infrastructure system 502 can be shared by multiple users and dynamically re-allocated per demand. Additionally, resources can be allocated to users in different time zones. For example, cloud infrastructure system 502 can enable a first set of users in a first time zone to utilize resources of the cloud infrastructure system for a specified number of hours and then enable the re-allocation of the same resources to another set of users located in a different time zone, thereby maximizing the utilization of resources.

In certain examples, a number of internal shared services 532 can be provided that are shared by different components or modules of cloud infrastructure system 502 to enable provision of services by cloud infrastructure system 502. These internal shared services can include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain examples, cloud infrastructure system 502 can provide comprehensive management of cloud services (e.g., SaaS, PaaS, and IaaS services) in the cloud infrastructure system. In one example, cloud management functionality can include capabilities for provisioning, managing and tracking a customer's subscription received by cloud infrastructure system 502, and the like.

In one example, as depicted in FIG. 5, cloud management functionality can be provided by one or more modules, such as an order management module 520, an order orchestration module 522, an order provisioning module 524, an order management and monitoring module 526, and an identity management module 528. These modules can include or be provided using one or more computers and/or servers, which can be general purpose computers, specialized server computers, server farms, server clusters, or any other appropriate arrangement and/or combination.

In an exemplary operation, at step 534, a customer using a client device, such as client computing devices 504, 506 or 508, can interact with cloud infrastructure system 502 by requesting one or more services provided by cloud infrastructure system 502 and placing an order for a subscription for one or more services offered by cloud infrastructure system 502. In certain examples, the customer can access a cloud User Interface (UI) such as cloud UI 512, cloud UI 514 and/or cloud UI 516 and place a subscription order via these UIs. The order information received by cloud infrastructure system 502 in response to the customer placing an order can include information identifying the customer and one or more services offered by the cloud infrastructure system 502 that the customer intends to subscribe to.

At step 536, the order information received from the customer can be stored in an order database 518. If this is a new order, a new record can be created for the order. In one example, order database 518 can be one of several databases operated by cloud infrastructure system 502 and operated in conjunction with other system elements.

At step 538, the order information can be forwarded to an order management module 520 that can be configured to perform billing and accounting functions related to the order, such as verifying the order, and upon verification, booking the order.

At step 540, information regarding the order can be communicated to an order orchestration module 522 that is configured to orchestrate the provisioning of services and resources for the order placed by the customer. In some instances, order orchestration module 522 can use the services of order provisioning module 524 for the provisioning. In certain examples, order orchestration module 522 enables the management of business processes associated with each order and applies business logic to determine whether an order should proceed to provisioning.

As shown in the example depicted in FIG. 5, at step 542, upon receiving an order for a new subscription, order orchestration module 522 sends a request to order provisioning module 524 to allocate resources and configure resources needed to fulfill the subscription order. Order provisioning module 524 enables the allocation of resources for the services ordered by the customer. Order provisioning module 524 provides a level of abstraction between the cloud services provided by system environment 500 and the physical implementation layer that is used to provision the resources for providing the requested services. This enables order orchestration module 522 to be isolated from implementation details, such as whether or not services and resources are actually provisioned on the fly or pre-provisioned and only allocated/assigned upon request.

At step 544, once the services and resources are provisioned, a notification can be sent to the subscribing customers indicating that the requested service is now ready for use. In some instance, information (e.g., a link) can be sent to the customer that enables the customer to start using the requested services.

At step 546, a customer's subscription order can be managed and tracked by an order management and monitoring module 526. In some instances, order management and monitoring module 526 can be configured to collect usage statistics regarding a customer use of subscribed services. For example, statistics can be collected for the amount of storage used, the amount data transferred, the number of users, and the amount of system up time and system down time, and the like.

In certain examples, cloud infrastructure system 502 can include an identity management module 528 that is configured to provide identity services, such as access management and authorization services in cloud infrastructure system 502. In some examples, identity management module 528 can control information about customers who wish to utilize the services provided by cloud infrastructure system 502. Such information can include information that authenticates the identities of such customers and information that describes which actions those customers are authorized to perform relative to various system resources (e.g., files, directories, applications, communication ports, memory segments, etc.) Identity management module 528 can also include the management of descriptive information about each customer and about how and by whom that descriptive information can be accessed and modified.

Figure 6:
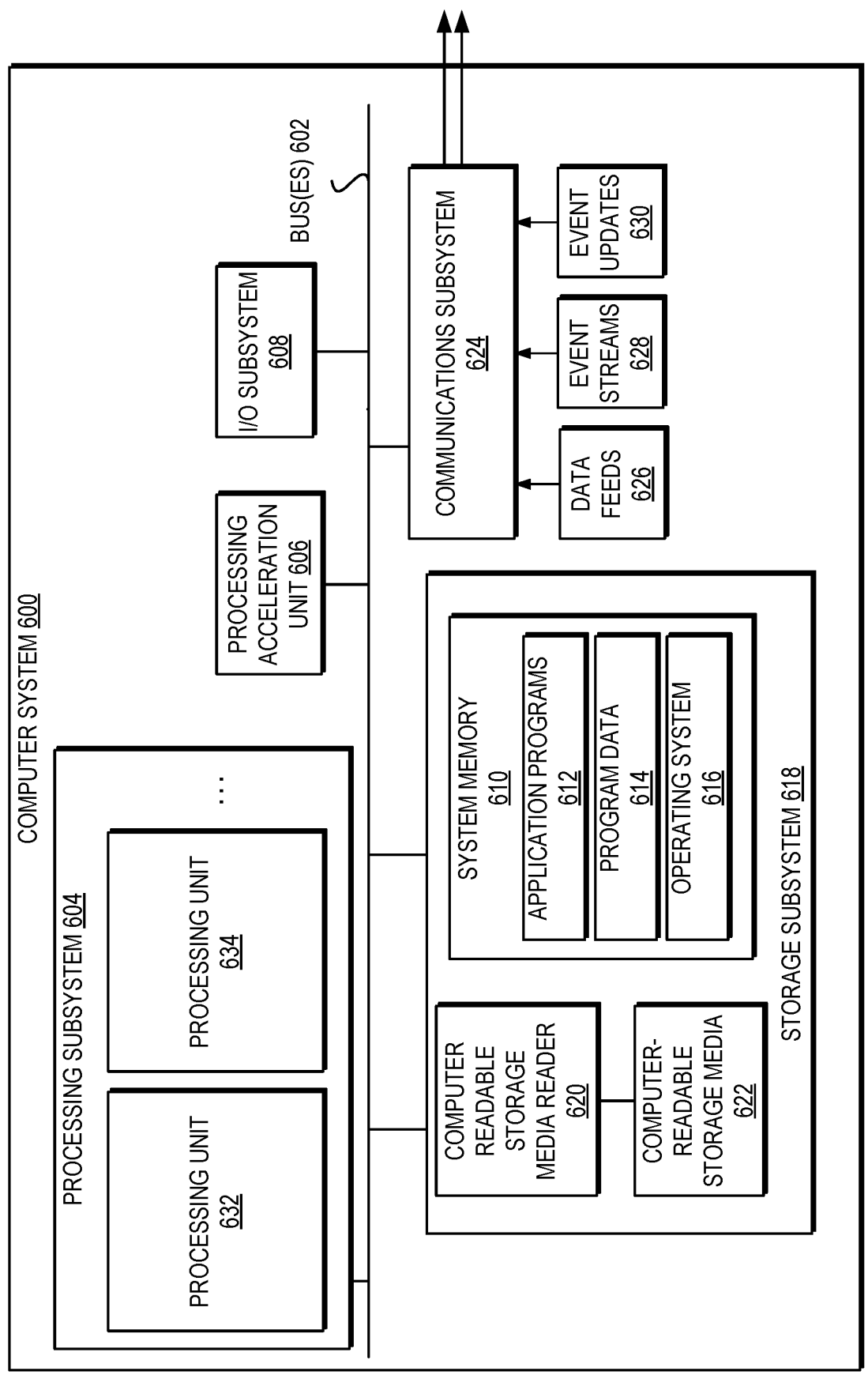
FIG. 6 illustrates an example of a computer system.

FIG. 6 illustrates an example of a computer system 600. In some examples, computer system 600 can be used to implement any of the various servers and computer systems described above. As shown in FIG. 6, computer system 600 includes various subsystems including a processing subsystem 604 that communicates with a number of peripheral subsystems via a bus subsystem 602. These peripheral subsystems can include a processing acceleration unit 606, an I/O subsystem 608, a storage subsystem 618 and a communications subsystem 624. Storage subsystem 618 can include tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative examples of the bus subsystem can utilize multiple buses. Bus subsystem 602 can be any of several types of bus structures including a memory bus or memory controller, a peripheral bus, and a local bus using any of a variety of bus architectures. For example, such architectures can include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and can comprise one or more processing units 632, 634, etc. A processing unit can include be one or more processors, including single core or multicore processors, one or more cores of processors, or any combination thereof. In some examples, processing subsystem 604 can include one or more special purpose co-processors such as graphics processors, digital signal processors (DSPs), or the like. In some examples, some or all of the processing units of processing subsystem 604 can be implemented using customized circuits, such as application specific integrated circuits (ASICs), or field programmable gate arrays (FPGAs).

In some examples, the processing units in processing subsystem 604 can execute instructions stored in system memory 610 or on computer-readable storage media 622. In various examples, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities disclosed herein.

In certain examples, a processing acceleration unit 606 can be provided for performing customized processing or for off-loading some of the processing performed by processing subsystem 604 so as to accelerate the overall processing performed by computer system 600.

I/O subsystem 608 can include devices and mechanisms for inputting information to computer system 600 and/or for outputting information from or via computer system 600. In general, use of the term "input device" is intended to include all possible types of devices and mechanisms for inputting information to computer system 600. User interface input devices can include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices can also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices can also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices can include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices can include, for example, medical imaging input devices such as computed tomography, magnetic resonance imaging, position emission tomography, medical ultrasonography devices. User interface input devices can also include, for example, audio input devices such as MIDI keyboards, digital musical instruments and the like.

User interface output devices can include a display subsystem, indicator lights, or non-visual displays such as audio output devices, etc. The display subsystem can be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices can include, without limitation, a variety of display devices that visually convey text, graphics and audio/video information such as monitors, printers, speakers, headphones, automotive navigation systems, plotters, voice output devices, and modems.

Storage subsystem 618 provides a repository or data store for storing information that is used by computer system 600. Storage subsystem 618 provides a tangible non-transitory computer-readable storage medium for storing the basic programming and data constructs that provide the functionality of some examples. Software (programs, code modules, instructions) that when executed by processing subsystem 604 provide the functionality described above can be stored in storage subsystem 618. The software can be executed by one or more processing units of processing subsystem 604. Storage subsystem 618 can also provide a repository for storing data used in accordance with the present disclosure.

Storage subsystem 618 can include one or more non-transitory memory devices, including volatile and non-volatile memory devices. As shown in FIG. 6, storage subsystem 618 includes a system memory 610 and a computer-readable storage media 622. System memory 610 can include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, can typically be stored in the ROM. The RAM typically contains data and/or program modules that are presently being operated and executed by processing subsystem 604. In some implementations, system memory 610 can include multiple different types of memory, such as static random access memory (SRAM) or dynamic random access memory (DRAM).

By way of example, and not limitation, as depicted in FIG. 6, system memory 610 can store application programs 612, which can include client applications, Web browsers, mid-tier applications, relational database management systems (RDBMS), etc., program data 614, and an operating system 616. By way of example, operating system 616 can include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 622 can store programming and data constructs that provide the functionality of some examples. Software (programs, code modules, instructions) that when executed by processing subsystem 604 a processor provide the functionality described above can be stored in storage subsystem 618. By way of example, computer-readable storage media 622 can include non-volatile memory such as a hard disk drive, a magnetic disk drive, an optical disk drive such as a CD ROM, DVD, a Blu-Ray® disk, or other optical media. Computer-readable storage media 622 can include, but is not limited to, Zip® drives, flash memory cards, universal serial bus (USB) flash drives, secure digital (SD) cards, DVD disks, digital video tape, and the like. Computer-readable storage media 622 can also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable storage media 622 can provide storage of computer-readable instructions, data structures, program modules, and other data for computer system 600.

In certain examples, computer system 600 can also include a computer-readable storage media reader 620 that can further be connected to computer-readable storage media 622. Together and, optionally, in combination with system memory 610, computer-readable storage media 622 can comprehensively represent remote, local, fixed, and/or removable storage devices plus storage media for storing computer-readable information.

In certain examples, computer system 600 can provide support for executing one or more virtual machines. Computer system 600 can execute a program such as a hypervisor for facilitating the configuring and managing of the virtual machines. Each virtual machine can be allocated memory, compute (e.g., processors, cores), I/O, and networking resources. Each virtual machine typically runs its own operating system, which can be the same as or different from the operating systems executed by other virtual machines executed by computer system 600. Accordingly, multiple operating systems can potentially be run concurrently by computer system 600. Each virtual machine generally runs independently of the other virtual machines.

Communications subsystem 624 provides an interface to other computer systems and networks. Communications subsystem 624 serves as an interface for receiving data from and transmitting data to other systems from computer system 600. For example, communications subsystem 624 can enable computer system 600 to establish a communication channel to one or more client computing devices via the Internet for receiving and sending information from and to the client computing devices.

Communications subsystem 624 can support both wired and/or wireless communication protocols. For example, in certain examples, communications subsystem 624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some examples communications subsystem 624 can provide wired network connectivity (e.g., Ethernet) in addition to or instead of a wireless interface.

Communication subsystem 624 can receive and transmit data in various forms. For example, in some examples, communications subsystem 624 can receive input communication in the form of structured and/or unstructured data feeds 626, event streams 628, event updates 630, and the like. For example, communications subsystem 624 can be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 624 can be configured to receive data in the form of continuous data streams, which can include event streams 628 of real-time events and/or event updates 630, that can be continuous or unbounded in nature with no explicit end. Examples of applications that generate continuous data can include, for example, sensor data applications, financial tickers, network performance measuring tools (e.g., network monitoring and traffic management applications), clickstream analysis tools, automobile traffic monitoring, and the like.

Communications subsystem 624 can also be configured to output the structured and/or unstructured data feeds 626, event streams 628, event updates 630, and the like to one or more databases that can be in communication with one or more streaming data source computers coupled to computer system 600.

Computer system 600 can be one of various types, including a handheld portable device (e.g., an iPhone® cellular phone, an iPad® computer tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art will appreciate other ways and/or methods to implement the various examples.

Although specific examples have been described, various modifications, alterations, alternative constructions, and equivalents are also encompassed within the scope of this disclosure. The modifications include any relevant combination of the disclosed features. Examples of the present disclosure are not restricted to operation within certain specific data processing environments, but are free to operate within a plurality of data processing environments. Additionally, although examples of the present disclosure have been described using a particular series of transactions and steps, it should be apparent to those skilled in the art that the scope of the present disclosure is not limited to the described series of transactions and steps. Various features and aspects of the above-described examples can be used individually or jointly.

Further, while examples of the present disclosure have been described using a particular combination of hardware and software, it should be recognized that other combinations of hardware and software are also within the scope of the present disclosure. Examples of the present disclosure can be implemented only in hardware, or only in software, or using any combination thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes can use different techniques, or the same pair of processes can use different techniques at different times.

The specification and drawings are, accordingly, to be regarded in an illustrative rather than a restrictive sense. It will, however, be evident that additions, subtractions, deletions, and other modifications and changes can be made thereunto without departing from the broader spirit and scope as set forth in the claims. Thus, although specific disclosure examples have been described, these are not intended to be limiting. Various modifications and equivalents are within the scope of the following claims.

What is claimed is:

1. A method comprising:
   receiving, by a communication system, an initial request from a computing device, wherein the initial request comprises a payload specifying multiple operations to be performed on a resource at a directory system, and wherein the initial request is received in a format according to a first communication protocol supported by the computing device;
   processing, by the communication system, the initial request to identify multiple methods associated with the first communication protocol for performing the multiple operations;
   generating, by the communication system, a subsequent request to perform the multiple operations in accordance with a second communication protocol that is supported by the directory system, wherein the second communication protocol is different from the first communication protocol, and wherein the generating comprises:
      determining the multiple operations to be performed in accordance with a second communication protocol based on a mapping between the multiple methods associated with the first communication protocol and the multiple operations in a format of the second communication protocol supported by the directory system; and
      generating the subsequent request to include a payload specifying the multiple operations in the format of the second communication protocol;
   sending, by the communication system, the subsequent request to the directory system for performance of the multiple operations;
   receiving, at the communication system, a result of the directory system performing the multiple operations on the resource;
   generating, by the communication system, a response in accordance with the first communication protocol, wherein the response includes the result of the directory system performing the multiple operations on the resource; and
   sending, by the communication system, the response to the computing device.

2. The method of claim 1, wherein the communication system includes a programming interface to:
   receive the initial request from the computing device; and
   send the response to the computing device.

3. The method of claim 1, wherein the first communication protocol is hypertext transfer protocol (HTTP), and wherein the one or more methods are one or more HTTP methods.

4. The method of claim 3, wherein the one or more HTTP methods are in accordance with Representational State Transfer (REST), and wherein the one or more HTTP methods include a GET method, a POST method, a PATCH method, or a DELETE method.

5. The method of claim 3, further comprising:
   determining, by the communication system, a mode for the initial request, wherein the mode includes a POST mode or a REST mode, and wherein the initial request is configured according to the mode.

6. The method of claim 5, wherein the POST mode includes a HTTP method, and wherein the REST mode includes a plurality of HTTP methods.

7. The method of claim 1, wherein the initial request includes a payload, and wherein the payload is formatted using JavaScript Object Notation (JSON).

8. The method of claim 1, wherein the second communication protocol is Lightweight Directory Access Protocol (LDAP).

9. A system comprising:
   one or more processors; and
   a non-transitory computer-readable medium containing instructions that, when executed by the one or more processors, cause the one or more processors to perform operations including:
   receive an initial request from a computing device, wherein the initial request comprises a payload specifying multiple operations to be performed on a resource at a directory system, and wherein the initial request is received in a format according to a first communication protocol supported by the computing device;

process the initial request to identify multiple methods associated with the first communication protocol for performing the multiple operations;

generate a subsequent request to perform the multiple operations in accordance with a second communication protocol that is supported by the directory system, wherein the second communication protocol is different from the first communication protocol, and wherein the generating comprises:

determining the multiple operations to be performed in accordance with a second communication protocol based on a mapping between the multiple methods associated with the first communication protocol and the multiple operations in a format of the second communication protocol supported by the directory system; and generating the subsequent request to include a payload specifying the multiple operations in the format of the second communication protocol;

send the subsequent request to the directory system for performance of the multiple operations;

a result of the directory system performing the multiple operations on the resource;

generate a response in accordance with the first communication protocol, wherein the response includes the result of the directory system performing the multiple operations on the resource; and send the response to the computing device.

10. The system of claim 9, wherein the first communication protocol is hypertext transfer protocol (HTTP), and wherein the one or more methods are one or more HTTP methods, and wherein the second communication protocol is Lightweight Directory Access Protocol (LDAP).

11. A computer-program product tangibly embodied in a non-transitory machine-readable storage medium, including instructions that, when executed by the one or more processors, cause the one or more processors to:

receive, by a communication system, an initial request from a computing device, wherein the initial request comprises a payload specifying multiple operations to be performed on a resource at a directory system, and wherein the initial request is received in a format according to a first communication protocol supported by the computing device;

process, by the communication system, the initial request to identify multiple methods associated with the first communication protocol for performing the multiple operations;

generate, by the communication system, a subsequent request to perform the multiple operations in accordance with a second communication protocol that is supported by the directory system, wherein the second communication protocol is different from the first communication protocol, and wherein the generating comprises:

determining the multiple operations to be performed in accordance with a second communication protocol based on a mapping between the multiple methods associated with the first communication protocol and the multiple operations in a format of the second communication protocol supported by the directory system; and generating the subsequent request to include a payload specifying the multiple operations in the format of the second communication protocol;

send, by the communication system, the subsequent request to the directory system for performance of the multiple operations;

receive, at the communication system, a result of the directory system performing the multiple operations on the resource;

generate, by the communication system, a response in accordance with the first communication protocol, wherein the response includes the result of the directory system performing the multiple operations on the resource; and send, by the communication system, the response to the computing device.

12. The computer-program product of claim 11, wherein the first communication protocol is hypertext transfer protocol (HTTP), and wherein the one or more methods are one or more HTTP methods, and wherein the second communication protocol is Lightweight Directory Access Protocol (LDAP).

\* \* \* \* \*